United States Patent [19]

Palmer et al.

[11] Patent Number: 4,849,193

[45] Date of Patent: Jul. 18, 1989

[54] PROCESS OF PREPARING HYDROXYLAPATITE

[75] Inventors: Jay W. Palmer, Tampa, Fla.; Terry L. Rosenstiel, Mount Prospect, Ill.

[73] Assignee: United States Gypsum Company, Chicago, Ill.

[21] Appl. No.: 189,482

[22] Filed: May 2, 1988

[51] Int. Cl.$^4$ .............................................. C01B 25/32
[52] U.S. Cl. .................................. 423/308; 423/309; 423/311
[58] Field of Search ...................... 423/308, 309, 311

[56] References Cited

U.S. PATENT DOCUMENTS

| | | | |
|---|---|---|---|
| 3,787,900 | 1/1974 | McGee | 3/1 |
| 4,097,935 | 7/1978 | Jarcho | 3/1.9 |
| 4,324,772 | 4/1982 | Conn et al. | 423/309 |
| 4,481,175 | 11/1984 | Iino et al. | 423/308 |
| 4,497,075 | 2/1985 | Niwa et al. | 423/309 |
| 4,516,276 | 5/1985 | Mittelmeier et al. | 3/1.91 |
| 4,518,430 | 5/1985 | Brown et al. | 106/35 |
| 4,548,959 | 10/1985 | Nagai et al. | 523/115 |
| 4,612,053 | 9/1986 | Brown et al. | 706/35 |
| 4,629,464 | 12/1986 | Takata et al. | 623/16 |
| 4,673,355 | 6/1987 | Farris et al. | 433/218 |
| 4,721,615 | 1/1988 | Griffith et al. | 424/57 |
| 4,781,904 | 11/1988 | Tagaya et al. | 423/309 |
| 4,794,171 | 12/1988 | Tagaya et al. | 423/309 |

Primary Examiner—John Doll
Assistant Examiner—Wayne A. Langel
Attorney, Agent, or Firm—Robert H. Robinson; John M. Lorenzen; Robert M. Didrick

[57] ABSTRACT

This invention relates to the manufacture of hydroxylapatite in a through-solution process wherein monobasic calcium phosphate is reacted with a calcium hydroxide solution. In a preferred embodiment, an acidic premix is formed by reacting phosphoric acid and calcium hydroxide with high shear agitation in a first stage, and thereafter reacting the acidic premix with a saturated solution of calcium hydroxide also under high shear agitation in a second stage. The second stage reaction is carried out in an alkaline solution by carefully metering the acid premix into the calcium hydroxide solution whereby the pH of the solution is maintained above 11 until the reaction is near completion. It is particularly preferred to use a stoichiometric portion of calcium hydroxide in carrying out the reactions. After the hydroxylapatite precipitate is recovered, it may be sintered at a temperature between about 700° C. and 1100° C. for about 5 to 30 minutes to form a crystalline hydroxylapatite.

12 Claims, 1 Drawing Sheet

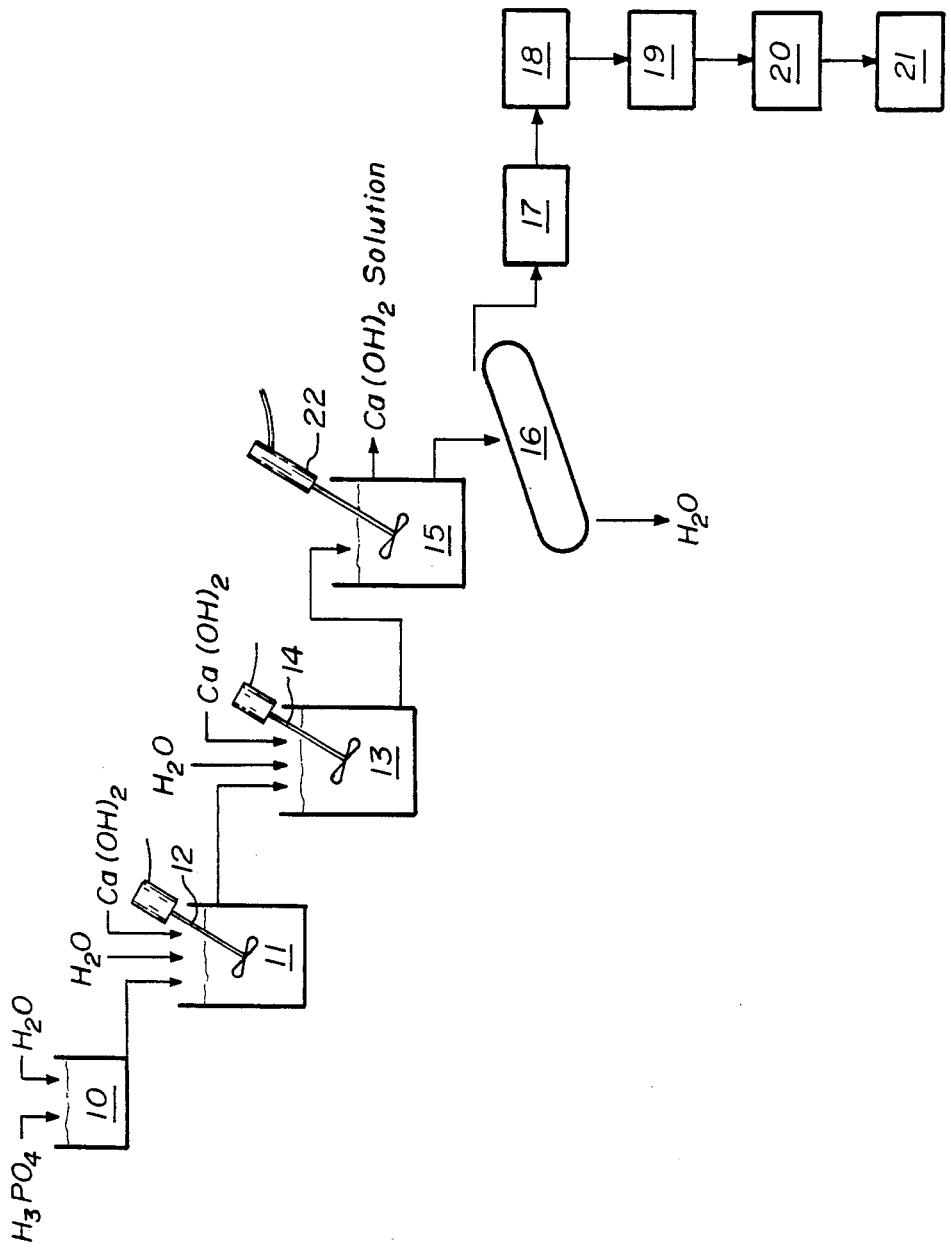

PROCESS OF PREPARING HYDROXYLAPATITE

BACKGROUND OF THE INVENTION

1. Field of the Invention

The present invention relates to the manufacture of hydroxylapatite, useful as a human or animal implant material and for other purposes. In more detail, the present invention concerns a novel method of preparing hydroxylapatite materials that further provides readily controllable individual crystal particle sizes and surface annealing.

2. Description of the Prior Art

Hydroxylapatite, represented by the formula $Ca_{10}(PO_4)_6(OH)_2$ or the unit formula $Ca_5(PO_4)_3(OH)$, is a mineralogical term for one of the inorganic constituents of the hard tissues of living bodies such as bone, teeth, etc. In chemical nomenclature, it is also known as pentacalcium triphosphate and has a theoretical calcium to phosphorus atomic ratio (Ca/P ratio) close to 1.67 and a particular physical structure as determined by X-ray diffraction analysis. As the natural mineralogical material is a primary constituent in the formation of teeth and bones of the living body, there have been considerable attempts to synthesize a sintered or fired ceramic synthetic material for use as implants and for tooth or bone replacement. A recurrent theme in many of these attempts has concerned the resemblance of the synthesized material to the natural material. This resemblance does not concern chemical purity in the sense that the material not contain impurities so much as it has centered upon material properties such as the atomic ratio of Ca/P in the synthesized material, porosity, density and thermal stability.

In one process, according to U.S. Pat. No. 4,097,935, a substantially pure hydroxylapatite in the form of a sintered ceramic having an average crystallite size in the range of 0.2–3 micrometers(um), and further characterized by the absence of pores, cleavage along smooth curved plane and the absence of birefringence, is obtained at close to the theoretical Ca/P ratio. This material is obtained by reacting ammonium phosphate with calcium hydroxide in aqueous medium while regulating the pH to 10–12 to produce an amorphous precipitate. After separating and drying, the precipitate is fired at a temperature of 1000°C. to 1250°C. The time period to effect sintering increases as the temperature decreases, and thus, up to 3 hours is required at the lower temperatures in this range, e.g. 1000 °C. If any porosity is to be imparted, the amorphous material is mixed with organic binder which burns out during firing or mechanical holes are drilled in the sintered product. According to some literature, this material is thermally unstable, decomposing to whitlockite, also known as tricalcium phosphate.

In U.S. Pat. 4,548,959, there is reported a synthetic ceramic hydroxylapatite useful as an implant material having an atomic ratio of Ca/P of 1.67–1.69, an average crystal size of 4–20 micrometers(um), a density of 3.14–3.16 grams per cubic centimeter (g/cc) and thermal stability, wherein whitlockite is said not to be shown even after the ceramic is heated for at least one hour at 1350°C. The process for preparing this material is based upon reacting calcium hydroxide with an aqueous solution of phosphoric acid in an inert atmosphere. It is necessary in this process to use a particular calcium hydroxide derived from pressure hydrating a specially prepared calcium oxide. Further, the precipitation reaction is conducted under elevated pressure and temperature in order to obtain the desired precipitate. Such process requirments are capital and energy intensive. The gelatinous precipitate is then fired at 850°–1400°C. for 0.5–5 hours, preferably 1250–1400°C. for 1–3 hours. This, too, is energy intensive.

U.S Pat. 4,324,772 describes a continuous, two-stage process for producing hydroxylapatite by reacting aqueous solutions of calcium oxide (lime) and phosphoric acid. In the first stage, the reaction is carried out under vigorous agitation at alkaline pH (ranging from about 9.5 to about 11) whereby approximately 90% of the reaction is completed in the first stage. The reaction is continued in the second stage still under vigorous agitation by adding additional phosphoric acid sufficient to maintain the pH at about 7 to about 7.4. After flash drying the reaction product, submicron, powdered hydroxylapatite, is recovered.

SUMMARY OF THE INVENTION

Basically, the present invention resides in finding a "through-solution" synthesis at atmospheric pressure and ambient temperatures for preparing hydroxylapatite from an acidic solution in which monobasic calcium phosphate is reacted with a calcium hydroxide solution. However, the solubility of monobasic calcium phosphate is substantially greater than calcium hydroxide under atmospheric conditions. Further, the ratio of calcium hydroxide in solution to monobasic calcium phosphate in solution is quite delicate to control in that at least four separate reactions yielding four different products are involved in mix ratios ranging only from 7:3 to 2:1 on the one end to 5:3 to 1:1 on the other end of the range. This explains the imprecision in products and high variation in chemical and physical properties that may result from attempts to prepare the desired hydroxylapatite product.

Thus, an object and advantage of the present invention is to provide a precisely controllable, through-solution process to produce hydroxylapatite without interfering side reactions.

Another object is the provision of a more rapid sintering process for the preparation of hydroxylapatite materials.

Still another object is the provision of a rapid and economic process for preparing hydroxylapatite materials which can be practiced commercially.

Basically, according to the present invention, an acidic calcium phosphate solution is reacted with a calcium hydroxide solution, with both solutions near saturation when combined, so as to obtain an amorphous hydroxylapatite precipitate without undesired side reactions. After separation and drying, hydroxylapatite precipitate is sintered at 700°–1100°C. for about 5–30 minutes to obtain the desired ceramic hydroxylapatite material.

Generally, the present invention provides a process for obtaining hydroxylapatite by blending dilute aqueous solutions, preferably solutions that are near saturation, of monobasic calcium phosphate (monocal) and calcium hydroxide, followed by separation (e.g. centrifugation), drying, and sintering of the precipitate at 700–1100°C. for about 5–30 minutes to obtain hydroxylapatite having close to the theoretical Ca/P ratio. Thus, in one form of the present invention, a dilute aqueous solution of monobasic calcium phosphate (monocal) is brought into contact with a dilute aqueous solution of calcium hydroxide, in carefully metered proportions, to obtain the amorphous hydroxylapatite precipitate.

In a preferred embodiment of the present invention, the water requirement is substantially reduced by first forming an acidic premix with a portion of the stoichiometric quantity of calcium hydroxide, and subsequently adding it to the remainder of the required calcium hydroxide. The second portion of calcium hydroxide comprises saturated slurry (a basic solution). However, solution reaction is achieved by maintaining the initial pH of the basic calcium hydroxide solution substantially throughout the reaction. This is accomplished by adding, very slowly, the monocal or other acidic premix solution at a rate and amount proportioned to react with calcium hydroxide in solution at the rate that the solid phase calcium hydroxide of the slurry dissolves, whereby the calcium hydroxide concentration in the solution is maintained. Stirring is required to avoid localized lower PH conditions favoring formation of other calcium phosphates in the main reaction vessel. The addition rate of the acidic premix to the basic calcium hydroxide solution must be monitored closely and done slowly so as to ensure adequate dissolution of the calcium hydroxide and maintenance of proper stoichiometry. By continuous intense stirring and by introducing the acidic premix at a rate substantially equivalent to the rate at which calcium hydroxide dissolves to replace the reacted calcium hydroxide in solution, the competing side reactions forming undesirable calcium phosphate by-products are avoided. As noted above, this is accomplished by close control of the solution pH, maintaining an alkaline pH throughout the reaction. It is preferred that the pH of the reaction solution is not permitted to go below 11 during the reaction.

BRIEF DESCRIPTION OF THE DRAWINGS

The FIGURE is a schematic flow diagram for the through-solution reaction of an acidic premix containing calcium phosphate (monocal) with a stoichiometric amount of calcium hydroxide to precipitate hydroxylapatite.

DESCRIPTION OF THE PREFERRED EMBODIMENTS

Basically, the present invention provides a different method for synthesizing hydroxylapatite which utilizes unique reaction sequences of calcium hydroxide, featuring an acidic premix of calcium phosphate (monocal) as the starting reactant. The overall stoichiometric conversion of the calcium phosphate (monocal) solution reacted with a calcium hydroxide solution to form an amorphous hydroxylapatite is represented by the following reaction:

$$3Ca(H_2PO_4)_2 \cdot 2H_2O + 7Ca(OH)_2 \rightarrow 2Ca_5(PO_4)_3OH + 18H_2O \quad (1)$$

This may be achieved in a single stage reaction. In a preferred embodiment the reaction is carried out by splitting the calcium hydroxide reactant into at least two distinct stages, reacting one portion separately with phosphoric acid to form an acidic premix solution, and then combining the premix with the remaining calcium hydroxide solution under alkaline conditions. This divides the calcium hydroxide required for the preparation of hydroxylapatite between the following reactions:

$$2H_3PO_4 + Ca(OH)_2 \xrightarrow[\text{acid}]{\text{excess}} Ca(H_2PO_4)_2 + 2H_2O \quad (2)$$

$$3Ca(H_2PO_4)_2 + 7Ca(OH)_2 \longrightarrow 2Ca_5(PO_4)_3OH + 12H_2O \quad (3)$$

By careful balance of the portions of th calcium hydroxide reactant, the reaction may proceed efficiently at just under saturation conditions. Basically, this is accomplished by very slowly metering the acidic premix of calcium phosphate (monocal) obtained in the first reactor vessel [represented by reaction (2)] into the main reactor vessel containing the remainder of the calcium hydroxide required for reaction (3). In effect, at the point of entry of the premix solution into the main reactor with continued high shear agitation, a through-solution reaction is provided by monitoring the pH to maintain an alkaline reaction medium, preventing a conversion to acidic conditions. The main reactor is maintained at the initial basic (alkaline) pH where hydroxylapatite is the preferred precipitate based upon solubilities, until virtually all of the reactants have been consumed. In other words, at the point where the premix enters into the main reactor, the acidic premix solution is being added at a rate such that it is reacting with calcium hydroxide in solution to form hydroxylapatite (and thus taking dissolved calcium hydroxide out of solution in forming the precipitate) at substantially the same rate that excess calcium hydroxide from the suspended solids in the main reactor is dissolving into the calcium hydroxide solution to maintain a substantially saturated condition. This is provided by maintaining the pH in the main reactor above 11, preferably in the range of from about 12 to about 13, until the reaction is near completion.

Referring to the FIGURE, an acidic premix solution containing calcium phosphate is provided by diluting a good grade of low impurity commercial phosphoric acid in the dilution tank (10) to form an approximately 20–30% by weight phosphoric acid solution. Calcium hydroxide and water are added to the premix tank (11) to form a solution with excess calcium hydroxide, and the diluted phosphoric acid solution is added to the premix tank (11) with high shear agitation provided by a high speed agitator (12). The amount of water added to the premix tank (11) is variable. Depending upon the amount of calcium hydroxide present, a given amount of water is able to dissolve a specific amount of that calcium hydroxide at the temperature maintained in the premix tank (11) and the main reactor (13). The amount of water added to control the heat of reaction is such that cool conditions below about 30°C. is maintained in order to provide the highest solubility of the calcium hydroxide in both the premix tank (11) and the main reactor (13). The phosphoric acid is added gradually to the premix tank (11), and upon the formation of an interim reaction product, more calcium hydroxide can be dissolved by the given volume of water in the tank (11). Thus, more calcium hydroxide can be dissolved than would dissolve in the water initially present in the tank (11). By introducing the acid solution slowly into premix tank (11), a substantial amount of suspended calcium hydroxide is thereby dissolved to form an acidic calcium phosphate (monocal) premix.

The same procedure is followed in the main reactor (13), in that first a given amount of water and more calcium hydroxide than will dissolve therein are added to the reactor. Thereafter, with high shear agitation provided by a high speed agitator (14) under turbulent flow, a portion of the acidic calcium phosphate premix is added gradually enough so as to maintain the pH above 11 in the main reactor (13) and to prevent adverse side reactions. Under the alkaline conditions, the excess calcium hydroxide dissolves at approximately the same rate as the amorphous hydroxylapatite precipitates. Because of the high shear agitation under turbulent flow conditions, all reactants including suspended excess calcium hydroxide particles are diffused throughout the reactor tank (13). The reagents are able to react in solution and change phase to the precipitated hydroxylapatite at a rate that will not fall out of equilibrium with the rate of calcium hydroxide dissolution. The dissolved calcium hydroxide particles are then available to react with the further additions of acidic calcium phosphate (monocal).

Essentially, the conditions in both the acidic premix reactor (11) and the main reactor (13) involve saturating a calcium hydroxide solution, although to a different degree in each reactor. In the most preferred form of the present invention, the acidic premix is a solution of calcium phosphate (monocal) and phosphoric acid having a pH range of about 1.5–3.5, with a pH of about 2 being particularly preferred. When the remainder of the calcium hydroxide is carefully added to the main reactor (13) so as to maintain a high pH (at least 11) until substantial completion of the reaction, the pH will be maintained at preferably about 12–13.

Still referring to the FIGURE, the amorphous hydroxylapatite is withdrawn from the main reactor (13) into a holding tank (15) where it may be held in suspension for several hours with gentle agitation by an air-driven agitator (22) and subsequently separated such as by filtering or centrifuging (16). The hydroxylapatite is then dried to an intermediate filter cake product in an oven (17) and is sintered as by firing in a furnace (18) at standard temperatures and durations to form the desired ceramic product. Thereafter, the hydroxylapatite may be ground into particles in an attrition mill (19), classified by size/weight in a classifier (20) and packaged (21).

The following examples will illustrate various specific embodiments of the process of the present invention. Of course, it is to be understood that the following examples are by way of illustration only and are in no way to be construed as limitations on the present invention.

EXAMPLE I

Hydroxylapatite was produced on a bench scale basis starting with 52 ml of 85% phosphoric acid being added to 100 ml of de-ionized water to form the beginning of an acidic premix. Separately, 24 grams of calcium hydroxide were added, with stirring, to 300 ml of de-ionized water. The phosphoric acid was then added drop-wise to the stirred calcium hydroxide solution. After completing the addition, this acidic premix was a clear mixture with a slight yellow tinge and a pH of 2.1.

The remainder of the stoichiometric calcium hydroxide, 78 grams, was added with stirring to 600 ml of de-ionized water, and the acidic premix was added drop-wise to this calcium hydroxide slurry until the pH was approximately 11. This mixture was stirred overnight, and then allowed to settle for 24 hours and filtered. The obtained solids, approximately 120 grams, were dried several days at 45°C. and sintered.

EXAMPLE II

In a larger scale production, 4.245 liters of NF grade phosphoric acid (85–88% $H_3PO_4$) was diluted with 19.53 liters of de-ionized water in an acid dilution tank and pumped at a rate of about 10 liters per hour into a premix reactor containing a slurry of 2.075 kilograms of U.S.P. grade calcium hydroxide suspended in 70.5 liters of de-ionized water. The materials were mixed at an ambient temperature of 24–25°C. in a 114 liter reactor equipped with a 3-bladed resin-coated impeller (to prevent contamination by metal ions) operating at 100–200 revolutions per minute to obtain a clear solution having a pH of about 2. About 79 liters of this premix solution was gradually added to a 189 liter main reactor tank (resin-lined to prevent contamination by metal ions) at 23°C. containing a slurry of 5.237 kilograms of U.S.P. grade calcium hydroxide suspended in 93 liters of deonized water while maintaining the pH at 12 or greater for the bulk of the addition. The pH of the reaction solution was about 11.5 after full digestion. The mixture was allowed to digest and settle for two days, then pumped to a filter where it was filtered without washing. The filtered product, about 10 kilograms, was dried at 45°C. and sintered in a muffle furnace at 1000°C. for ten minutes.

Physical analysis showed the sintered product to have an average crystallite size of about 0.2 um, no birefringence under a polarizing microscope, an irregular cleavage, and a porosity of 0.77 cubic centimeters per gram determined by mercury porosimetry. Density was 3.16 grams per cubic centimeter as determined by sedigraph, chemical analysis gave a Ca/P ratio of 1.66, and X-ray diffraction analysis showed the product to be crystalline hydroxylapatite without the presence of other calcium phosphate products.

What is claimed is:

1. A process for manufacturing hydroxylapatite characterized by providing through solution reactions comprising the steps of
   (1) forming an acidic premix solution containing monobasic calcium phosphate (monocal);
   (2) forming a saturated solution of calcium hydroxide;
   (3) metering the acidic premix solution at ambient conditions into a reactor containing the calcium hydroxide solution which is being agitated, at a rate that maintains the pH of the mixture in the reactor above 11 to form a hydroxylapatite precipitate; and
   (4) recovering the hydroxylapatite precipitate.

2. The process of claim 1 in which the pH of the mixture is maintained between about 12 and about 13 during the metering of the acidic premix into the reactor.

3. The process of claim 1 in which said monobasic calcium phosphate (monocal) and reactants are reacted in stoichiometric proportions with essentially no excess of either reactant.

4. The process of claim 3 in which the acidic premix solution is metered into the reactor containing the calcium hydroxide solution at a rate substantially equivalent to the rate at which calcium hydroxide dissolves to replace the reacted calcium hydroxide so as to maintain the alkaline pH of the mixture in the reactor.

5. A two stage process for manufacturing hydroxylapatite characterized by providing through solution reactions comprising the steps of (1) under acidic reaction conditions and with high shear agitation of the reaction solution, metering phosphoric acid into a reactor containing a saturated solution of calcium hydroxide to produce an acidic premix solution containing monobasic calcium phosphate (monocal);

(2) forming a saturated solution of calcium hydroxide in a main reactor vessel;

(3) metering said acidic premix solution containing the monocal into said main reactor vessel containing the saturated solution of calcium hydroxide which is undergoing high shear agitation at a rate that maintains the pH of the solution in the reactor above 11 to form a hydroxylapatite precipitate; and (4) recovering the hydroxylapatite precipitate.

6. The process of claim 5 in which the acidic premix solution prepared in step (1) has a pH in the range of about 1.5 to 3.5, and the pH of the solution in the main reactor in step (3) during the formation of the hydroxylapatite is maintained in the range of about 12 to 13.

7. The process of claim 5 in which the acidic premix solution is metered into the main reactor vessel at a rate substantialy equivalent to the rate at which calcium hydroxide dissolves to replace the reacted calcium hydroxide so as to maintain the alkaline pH of the mixture in the reactor.

8. The process of claim 5 in which the hydroxylapatite precipitate is sintered at a temperature between about 700°C. and about 1100C. for about 5 to 30 minutes to form a crystalline hydroxylapatite.

9. A two stage process for manufacturing hydroxylapatite characterized by reacting substantially stoichiometric portions of calcium hydroxide in through solution reactions comprising the steps of (1) under acidic reaction conditions and with high shear agitation of the reaction solution, metering phosphoric acid into a reactor containing a portion of the stoichiometric amount of calcium hydroxide in a saturated solution thereof to produce an acidic premix solution containing monobasic calcium phosphate (monocal);

(2) forming a saturated solution of calcium hydroxide in a main reactor vessel with approximately the balance of the stoichiometric amount of calcium hydroxide;

(3) metering said acidic premix solution containing the monocal into said main reactor vessel containing the saturated solution of calcium hydroxide which is undergoing high shear agitation at a rate that maintains the pH of the solution in the reactor generally above 11 to form a hydroxylapatite precipitate; and (4) recovering the hydroxylapatite precipitate.

10. The process of claim 9 in which the acidic premix solution prepared in step (1) has a pH of about 2, and the pH of the solution in the main reactor in step (3) during the formation of the hydroxylapatite is maintained in the range of about 12 to 13.

11. The process of claim 9 in which the acidic premix solution is metered into the main reactor vessel at a rate substantially equivalent to the rate at which calcium hydroxide dissolves to replace the reacted calcium hydroxide so as to maintain the alkaline pH of the mixture in the reactor.

12. The process of claim 9 in which the hydroxylapatite precipitate is sintered at a temperature between about 700° C. and about 1100° C. for about 5 to 30 minutes to form a crystalline hydroxylapatite.

* * * * *